March 13, 1956 H. PARKER 2,737,979
MIXING VALVE STRUCTURE AND METHOD OF OPERATION
Filed March 28, 1952

Harold Parker Inventor
By W. O. Heilman Attorney

United States Patent Office 2,737,979
Patented Mar. 13, 1956

2,737,979

MIXING VALVE STRUCTURE AND METHOD OF OPERATION

Harold Parker, Regina, Saskatchewan, Canada, assignor to Esso Research and Engineering Company, a corporation of Delaware Application March 28, 1952, Serial No. 279,003

1 Claim. (Cl. 137—625.34)

The present invention relates to a method and apparatus for producing intimate liquid mixtures. More particularly, the invention relates to a valve structure especially adapted to effect mixing or emulsification of liquids utilizing the flow velocity of the liquids for that purpose. The valve structure contemplated is also adapted for controlling flow of the liquids to be mixed to a point of use beyond the valve.

It is an object of the invention to provide a mixing valve capable of producing a pressure drop through the valve of as high as from 40–50 pounds per square inch. It is also an object of the invention to provide such a valve for controlling the flow with reference to the pressure drop through the valve itself, as well as with reference to temperatures or liquid levels maintained in the apparatus with which the valve is associated.

Figure 1:
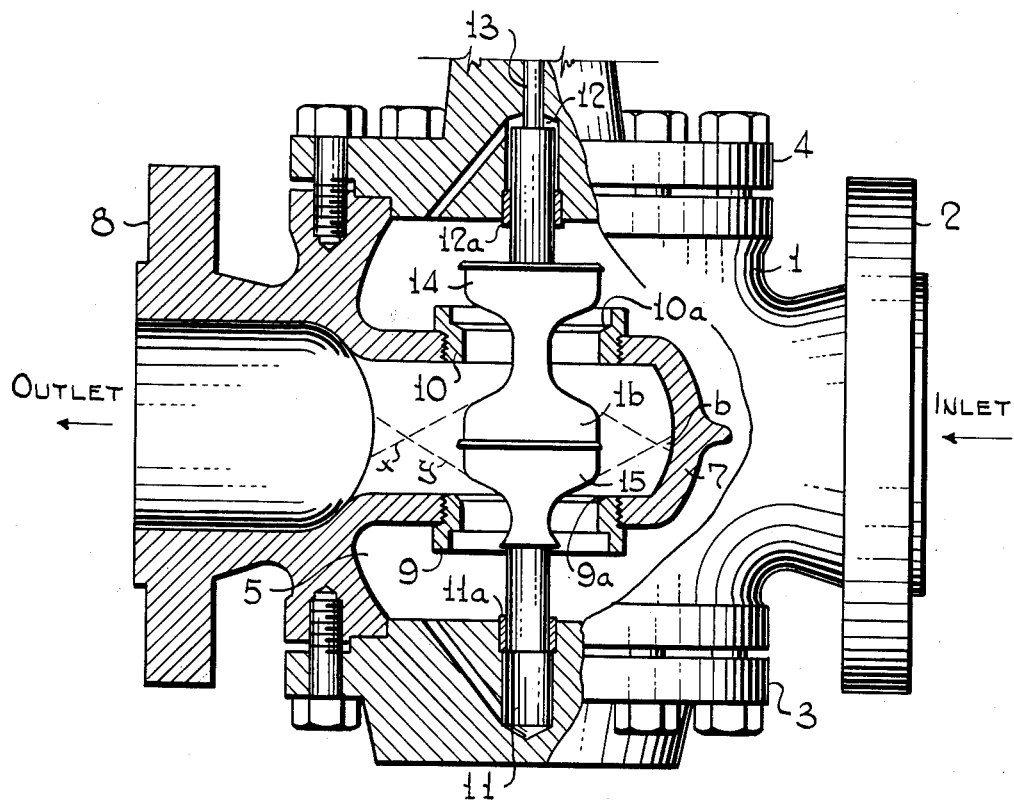
Figure 2:
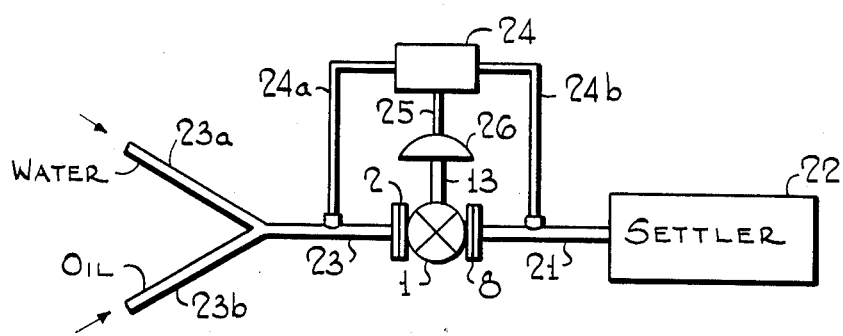

The invention may be more fully understood from the following description when read in conjunction with the accompanying drawings, in which:

Fig. 1 is a side elevational view of the valve structure contemplated and shown partly in section, and Fig. 2 is a schematic drawing showing the mixing valve in environmental relationship to associated apparatus in a system of the character contemplated for use of the valve.

Referring more particularly to the drawings, the numeral 1 designates a valve body having a flanged inlet 2. As shown, the valve body is provided with upper and lower opposed openings, the lower opening being provided with a flanged cover plate 3 and the upper opening adapted to receive a flanged valve bonnet 4. Internally of the valve body is provided a substantially spherical or spheroidal outer valve chamber 5 opening into an inner valve chamber 6. The inner valve chamber is formed internally of a walled portion 7 disposed within the outer valve chamber 5. This portion 7 is preferably cast or formed integrally with the valve body and opens outwardly therefrom by way of a flanged valve outlet port 8. Preferably the upper and lower surfaces of the walled portion 7 are slightly flattened and provided with oppositely disposed valve ports 9 and 10 in which are provided valve seats 9a and 10a respectively. These seats may be formed integrally within walled portion 7 or, as shown, may be insert members. The ports 9 and 10 are also aligned coaxially with a recess 11 in the cover plate member 3, and a similar recess 12 in the valve bonnet 4. Bushing members 11a and 12a are provided in each of these recesses and adapted for sliding engagement with a valve stem 13, extending into the valve body through the bonnet 4, the lower end of the valve stem being adapted for reciprocal telescopic relationship in the recess 11. Valve member 14 is mounted coaxially with the stem 13 so as to be disposed within the outer valve chamber, and provided for surface seating contact with the valve seat 10. A second valve member 15 similarly mounted on the stem 13 is disposed within the inner chamber so as to provide for surface seating contact with the valve seat 9a. Preferably these valve members 14 and 15 are provided with a substantially regular generally cone shaped peripheral surface configuration, which includes the parabolic configuration illustrated in Fig. 1, whereby liquid flowing through the valve ports is substantially uniformly dispersed in flowing over the surface of the valve member.

In addition to the valve members 14 and 15, there is provided a distributor element 16 associated coaxially with the valve stem 13 and of substantially the same diameter and configuration as the valve members 14 and 15. This element is disposed in opposite basal relationship to the inner valve member 15, extending uniformly upwardly and inwardly therefrom toward the valve member 14. The element 16 is adapted to receive the impact of the stream of liquid passed through the valve port 10 and seat 10a and distribute the flow in the inner valve chamber substantially in the same fashion as flow is distributed by the peripheral surface of the valve member 15. The valve members 14 and 15, and the distributor element 16 may be substantially frusto-conical members, if desired.

With reference to Fig. 2, the valve 1 is shown in general relationship to the environment of its use. The outlet port 8 is shown as connected to a conduit 21, which is in turn connected to a process vessel 22. The inlet port 2 of the valve is connected to a conduit line 23 for liquids to be mixed prior to introduction into the process vessel. In the system, as illustrated, the liquids contemplated are water and oil, which may be introduced into the conduit 23 by way of branch lines 23a and 23b respectively. Also illustrated in Fig. 2 is one means for operating the valve. This means includes a differential pressure controller 24 connected respectively to the up-stream and down-stream sides of the valve as by means of conduit lines 24a and 24b. The differential pressure controller 24, is in turn connected to a valve operating mechanism 26 as by means of a pneumatic, hydraulic or electrical connection 25. As shown, the mechanism 26 operates the valve stem 13. It is to be understood that the actuation of the valve may be accomplished as by air pressure operating means, electrical means, hydraulic means, or otherwise. Under certain circumstances the valve even may be operated manually.

The valve structure which has been thus described may be employed in any system where it may be desired to produce a high degree of mixing action by employment of the pressure and flow velocity of the liquids to be mixed. For example the valve is especially suited for use in connection with a system for removing soluble salts and other substances from petroleum crudes. These salts may be present as bromides, sulfides, carbonates, bicarbonates and otherwise, and should be removed from the crudes in order to avoid corrosion and other damage to refining and distillation equipment. One procedure for removal comprises the addition of substantial quantities of water to the crude material for the purpose of dissolving contained salts. In order to accomplish successful contact of the water and the saline materials, it is customary to agitate the crude and added water to produce an emulsion. The resulting emulsion is then passed into segregating or settling apparatus in which the water phase of the emulsion, containing the salts removed, is separated from the oil phase. In such a procedure employing a valve according to this application, the process vessel 22, as shown in Fig. 2, would provide a settling zone for separation of water from the oil. In such a system, the oil and water would preferably be introduced to the conduit 23 at temperatures of about 200° F. and at a pressure of about 75 pounds per square inch, although pressures up to about 200 pounds per square inch may be employed. The combined stream of oil and water is introduced by way of the conduit 23 into the inlet 2 of the valve 1, passing through the outer valve chamber 5 and the ports 14 and 15 into the inner valve chamber 6, and thence into conduit 21 through the outlet port 8. Ordinarily, during passage of the liquids through the valve, it is desirable to realize a pressure drop of at least about 20 pounds, and upwardly therefrom to about 40 to 50 pounds. This pressure drop may be controlled and maintained by means of the differential pressure controller 24 and valve actuating instrument 26, the controller being set for the pressure drop desired and the desired effect maintained thereby through the medium of the connections 24a and 24b with conduits 23 and 21, respectively. Variations in the pressure drop through the valve being compensated by opening or closing the valve 1 by means such as the differential pressure controller 24, acting through the members 25 and 26 to position the valve stem 13 as shown in the drawing.

In passage through the valve, the liquid material introduced by way of the inlet port 2 flows into the outer valve chamber, where the body of fluid is divided into two streams entering the inner chamber by way of valve ports 9 and 10. The stream of liquid passing through the valve port 10 meeting the upper surface of the element 16 is dispersed outwardly and downwardly into the chamber in a generally conical flow pattern, as indicated by dotted line $x$. The stream of liquid entering the inner chamber by way of the valve port 9 coming in contact with the lower surface of the valve element 15 is dispersed or distributed upwardly and outwardly in a substantially conical flow pattern similar to that produced by the corresponding surface of the element 16. This flow pattern is indicated by dotted lines $y$. The flow patterns of the respective streams will intersect substantially as indicated along the substantially common base line formed at the intersection of the dotted lines $x$ and $y$, and with high impact velocity, to produce a zone of extreme turbulence within the chamber 6 and in the presence of the body of contacted liquid therein. The combined materials as a mixture or emulsion will be discharged from the inner chamber 6 and from the valve by way of the port 8. Operation of the valve stem to move the valve members 14 and 15 toward or away from the valve seats 10a and 9a respectively, serves to control the volume of flow through the valve to any desired degree.

Although the apparatus and its operation has been described with reference to its use in conjunction with a system for desalting crude oil, the same principles of operation are applicable in any system requiring the production of intimate mixtures of materials. For example, the valve as described may be satisfactorily employed for incorporating various additives in gasoline, or the treatment of hydrocarbon oils with caustics, or other treating materials, as well as in any operation requiring the emulsification of substantially immiscible liquids.

What is claimed is:

A mixing device including a body member having an inlet and an outlet, an outer chamber in said body member communicating with said inlet, a walled inner mixing chamber disposed within said outer chamber and opening directly into said outlet, paired, opposed coaxial inlet ports opening inwardly through said inner chamber walls from said outer chamber, a first annular valve seat in one of said ports providing a valve seating surface portion facing into said outer chamber, a second annular valve seat in the other of said ports providing a valve seating surface portion facing into said inner chamber, a first valve member including an enlarged head portion engageable with the valve seating surface of said first valve seat and moveable therefrom into said outer chamber, said first valve member head portion having a substantially paraboloid conformation and providing a circumferential surface portion inclined toward the axis of said ports, said first valve inclined surface portion and said first valve seat defining between them an annular passageway opening inward from said outer chamber at an angle convergent toward the axis of said ports within said inner chamber when said first valve is moved into said outer chamber, a second valve member including an enlarged head portion engageable with said valve seating surface portion of said second valve seat and movable therefrom into said inner chamber, said second valve member having a substantially paraboloid conformation and providing a circumferential surface portion inclined toward the axis of said ports, said second valve inclined surface portion and said second valve seat defining between them an annular passageway opening inward from said outer chamber into said inner chamber at an angle divergent from the axis of said ports, a deflector member including an enlarged head portion having a substantially paraboloid conformation and providing a circumferential surface portion inclined toward the longitudinal axis of said deflector member, said deflector member mounted within said inner chamber with the enlarged head portion thereof joined in superimposed coaxial relation to said second valve member head portion, and with said deflector member inclined surface portion disposed in opposed, convergent relation to and with said first valve member inclined surface portion, and said deflector member and valve members being rigidly joined to move as a unit, whereby flow through said passageway defined between said second valve member and said second valve seat is caused to assume a substantially conical sheet-like form extending outwardly from said valve into said inner chamber, and flow through said passageway defined between said first valve member and said first valve seat is caused to flow inwardly over said first valve inclined surface portion toward the axis of said valve ports and then outwardly from said axis over the inclined surface portion of said deflector member within said inner chamber and to assume a substantially conically sheet-like form extending outwardly from the axis of said valve ports, said substantially conical, sheet-like flow forms intersecting within said inner chamber along a common circular base line spaced radially from the junction of said deflector member and second valve head portion.

References Cited in the file of this patent

UNITED STATES PATENTS

| 102,174 | Smith | Apr. 19, 1870 |
| 1,146,316 | Falk | July 13, 1915 |
| 1,167,300 | Henszey | Jan. 4, 1916 |
| 1,213,582 | Brown | Jan. 23, 1917 |
| 1,525,488 | Austin | Feb. 10, 1925 |
| 1,637,697 | Jacobsen | Aug. 2, 1927 |
| 1,718,673 | Wettstein | June 25, 1929 |
| 1,934,713 | Hughes | Nov. 14, 1933 |
| 2,115,998 | O'Connor | May 3, 1938 |
| 2,221,050 | Hoopes | Nov. 12, 1940 |
| 2,511,291 | Mueller | June 13, 1950 |
| 2,633,868 | Berhoudar | Apr. 7, 1953 |

FOREIGN PATENTS

| 140,024 | Germany | 1902 |
| 532,590 | Germany | 1931 |